INVENTORS.
JOSEPH H. PATON
JAMES W. SHERRILL
CHESTER A. VANDER PYL, JR
BY Charles C. Willson
ATTORNEY

INVENTORS.
JOSEPH H. PATON
JAMES W. SHERRILL
CHESTER A. VANDER PYL, JR.
BY

ATTORNEY

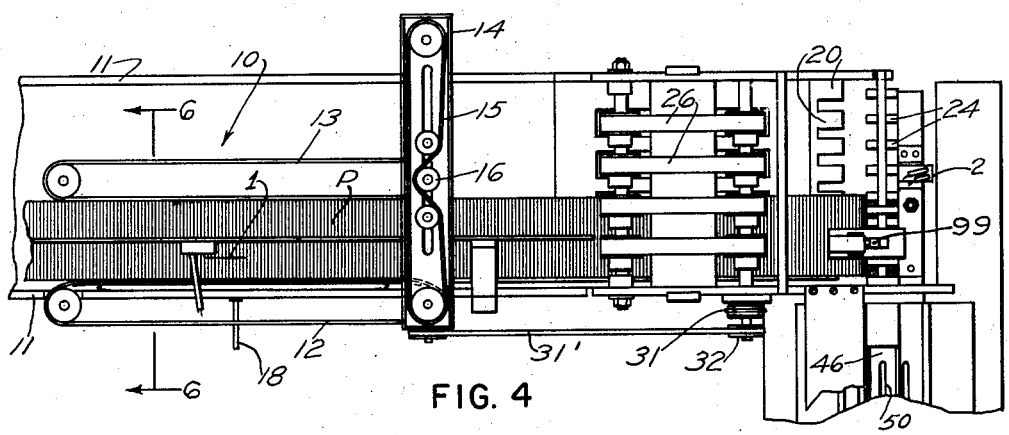
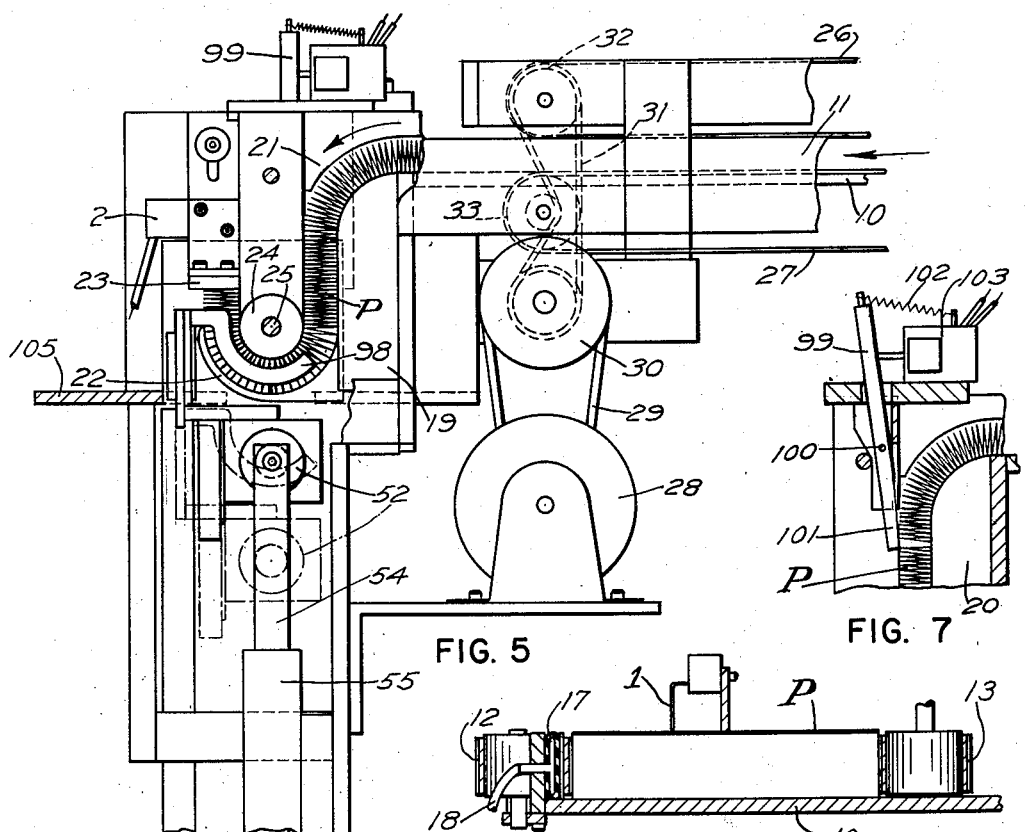
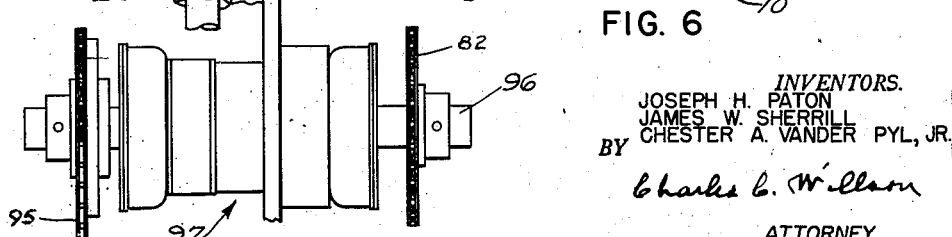

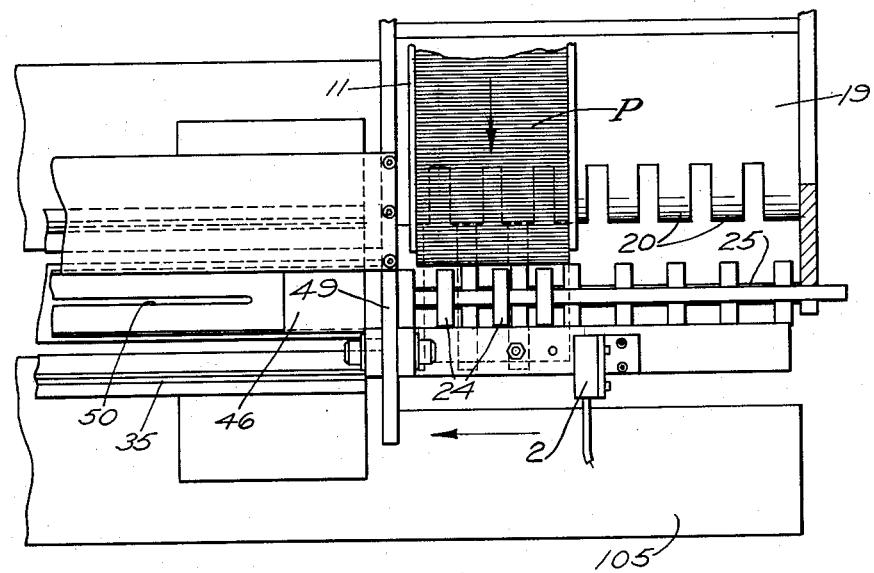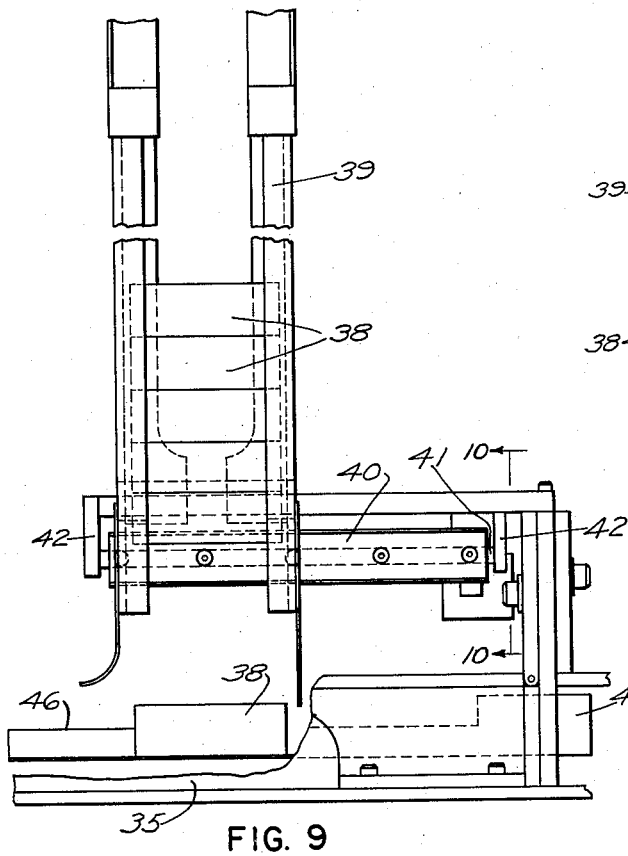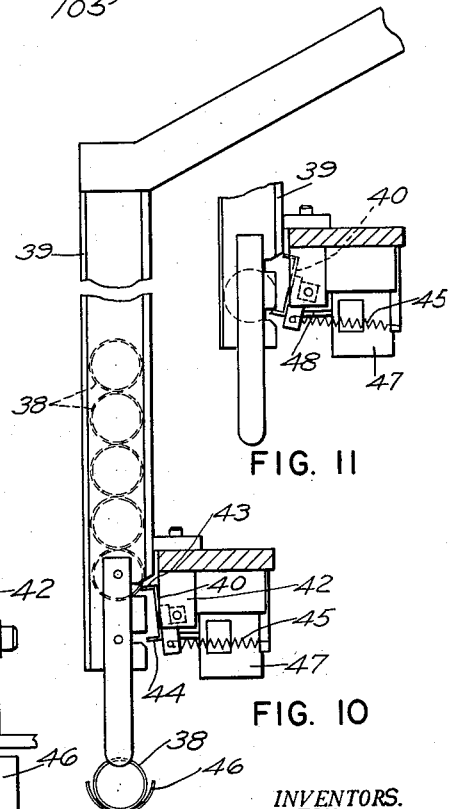

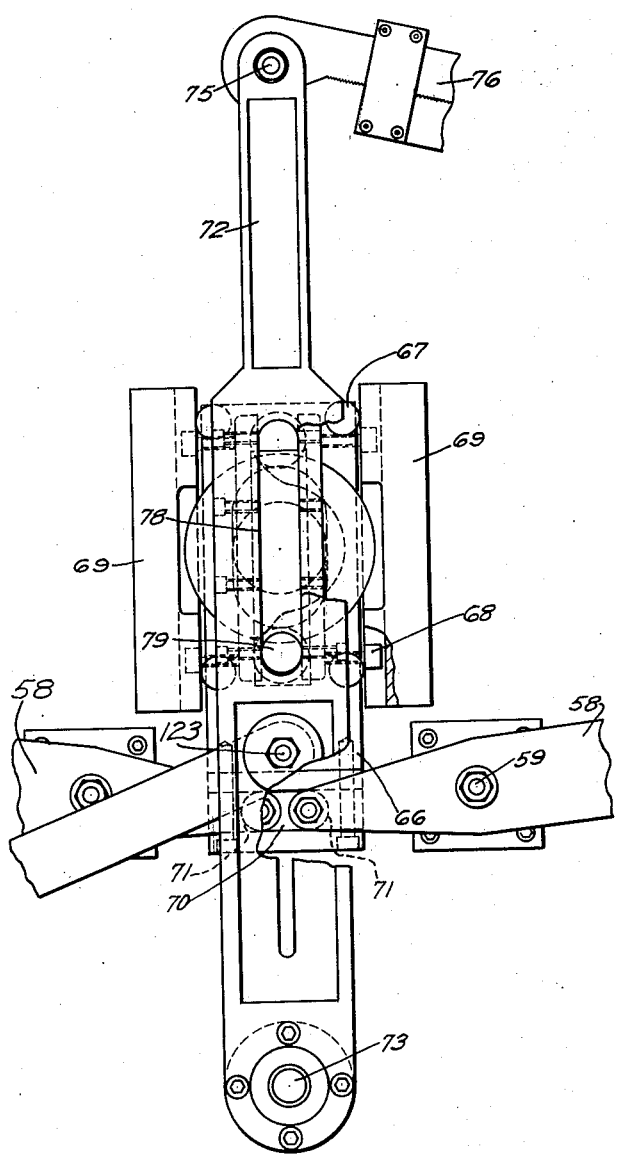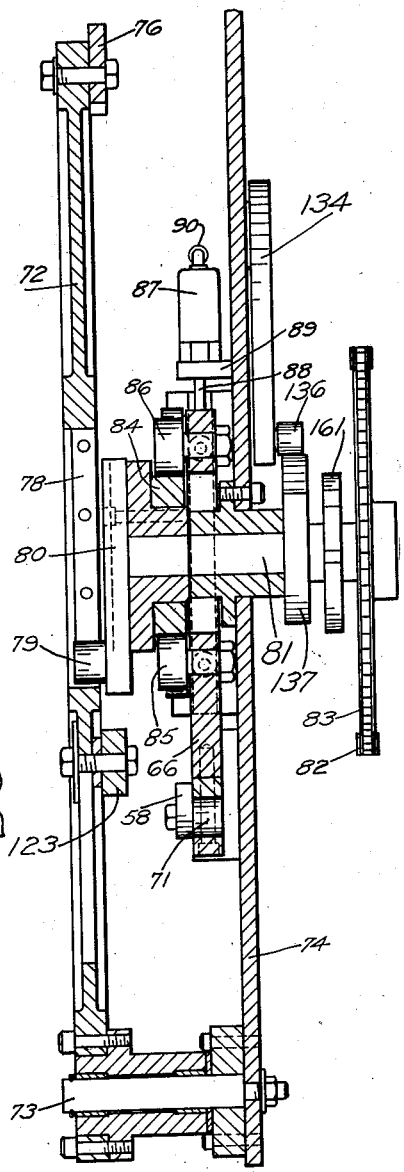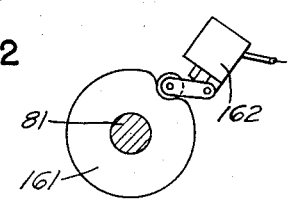
FIG. 12      FIG. 13
FIG. 13a
INVENTORS.
JOSEPH H. PATON
JAMES W. SHERRILL
CHESTER A. VANDER PYL, JR
BY Charles C. Willson
ATTORNEY

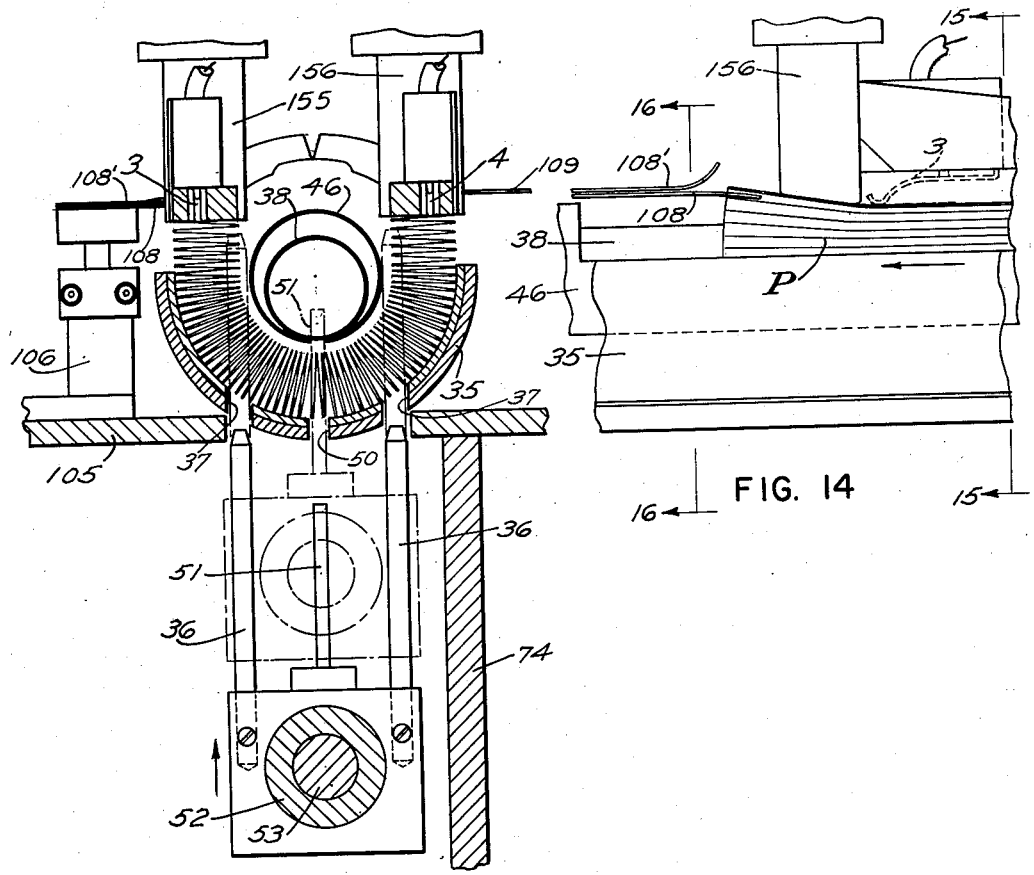
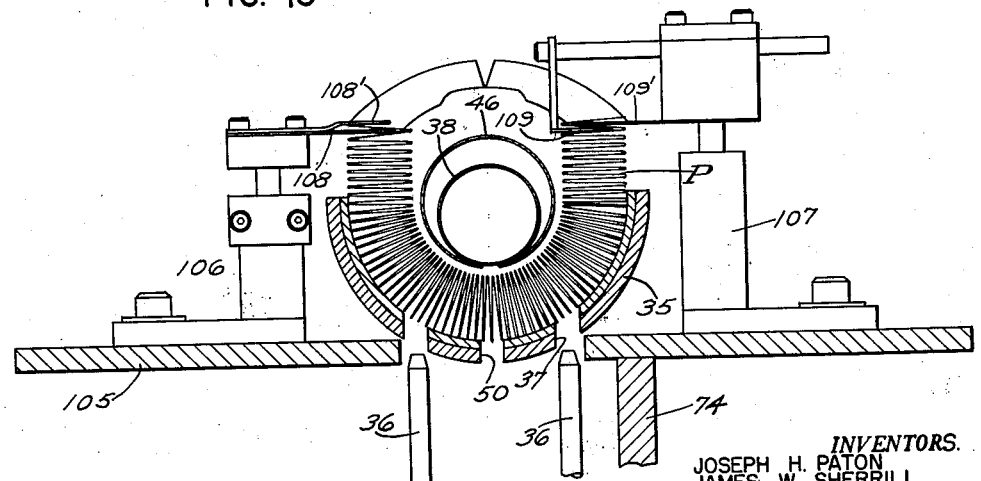

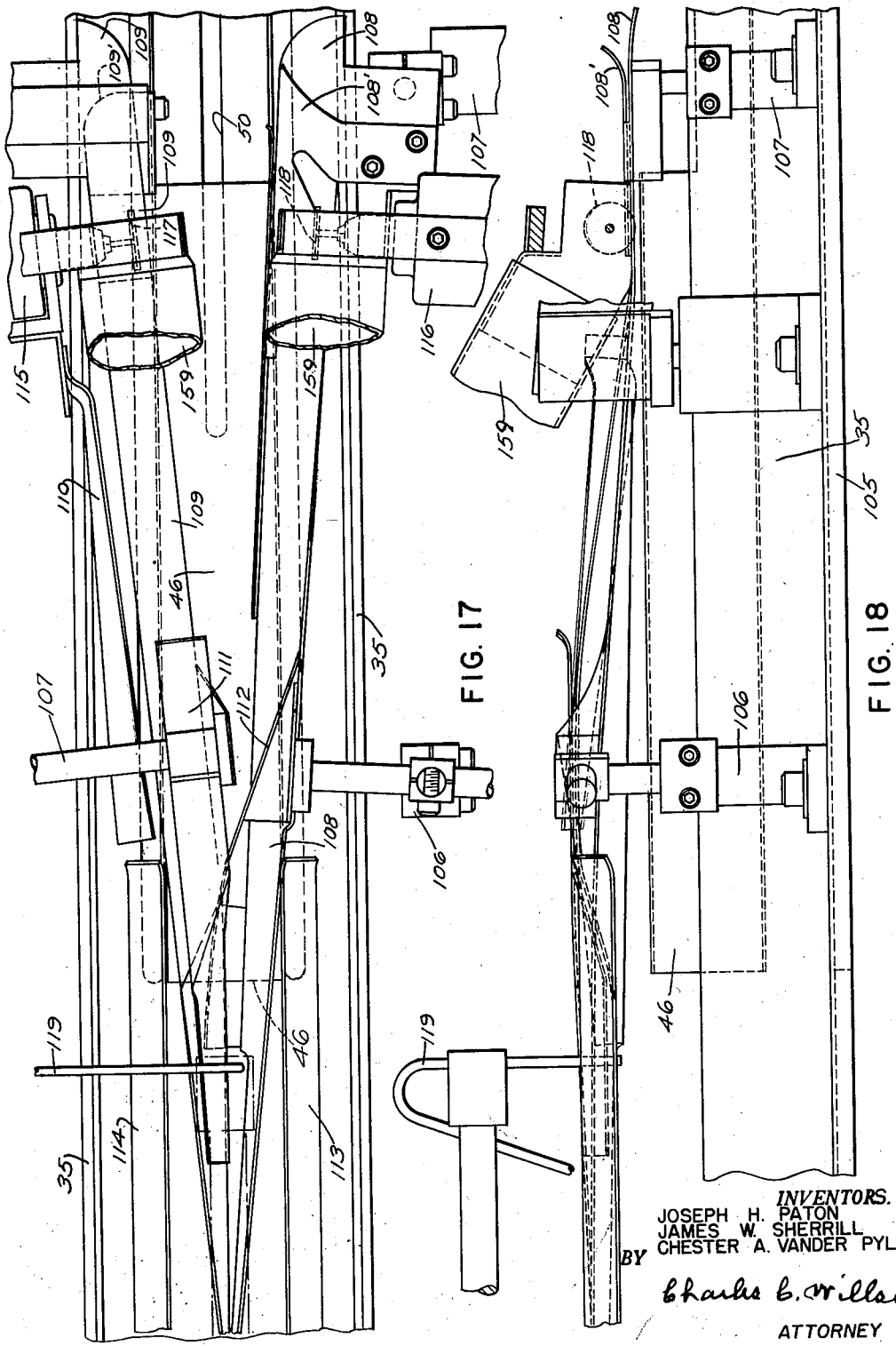

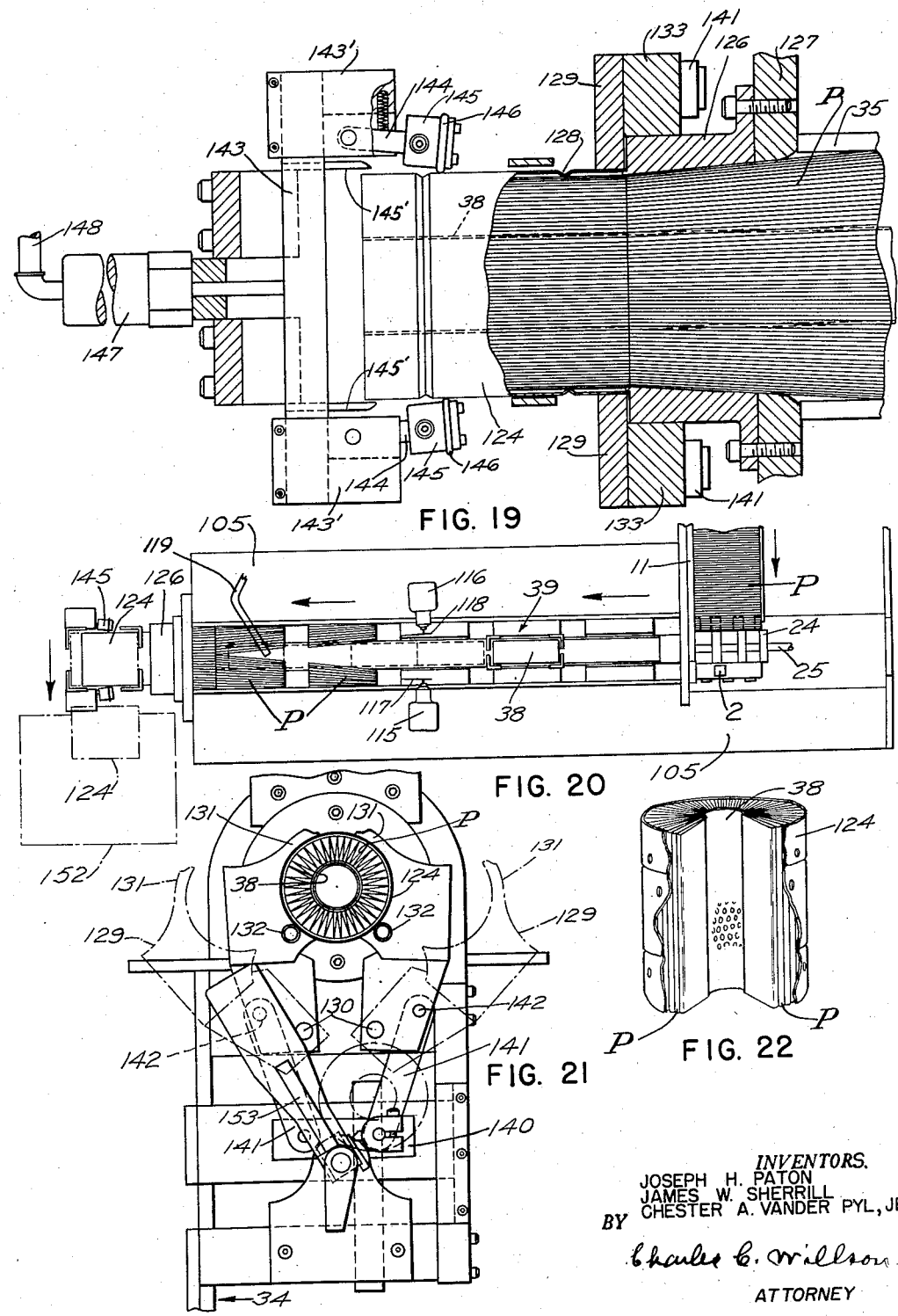

United States Patent Office 2,901,949
Patented Sept. 1, 1959

2,901,949

METHOD OF AND MACHINE FOR FORMING PLEATED PAPER INTO ANNULAR FILTER ELEMENTS

Joseph H. Paton, Attleboro Falls, Mass., James W. Sherrill, Pawtucket, R.I., and Chester A. Vander Pyl, Jr., North Attleboro, Mass., assignors to Fram Corporation, East Providence, R.I., a corporation of Rhode Island Application December 28, 1956, Serial No. 631,371

18 Claims. (Cl. 93—1)

This invention relates to a method of and apparatus for forming successive lengths of pleated filter paper into annular filter elements of the type that are now extensively used to filter the lubricating oil for motor vehicles.

These annular filter elements, as commonly constructed, comprise a perforated center tube that is surrounded by pleated porous paper disposed radially about the center tube with the pleats extending parallel to the tube axis. This pleated cylindrical element, with the center tube therein, is commonly provided with a protecting outer shell which may be formed of paper or metal, and such shell may have a number of perforations through which oil can pass to reach the filter paper.

Heretofore, these filter elements have been assembled by hand, and the operator would pick up a length of the pleated element and secure the two ends together so as to impart to the same a cylindrical shape having the pleats extending lengthwise of the cylinder. The operator would then insert a perforated center tube in this pleated cylindrical element. Next, she would compress the pleated element with her hands against the center tube and at the same time insert this cylindrical filter element inside of a protecting shell. This completes the operation of forming a cylindrical filter element ready for the market, except for the step of closing the ends of such cylindrical element by adhesively securing closure caps to the zig-zag ends of the pleated cylindrical element.

The machine of the present invention operates to perform all of the above mentioned operations automatically, at high speed, except that it does not secure the end caps to the cylindrically pleated element.

The operations contemplated by the present invention are performed by advancing pleated elements, each comprising a large number of pleats, along a support or guideway in a direction at right angles to that in which the pleats extend. This guideway terminates in a semi-circular arc, and as each pleated element is forced into this semi-circular portion of the guideway, it will assume the shape of one-half of a cylinder with the pleats extending lengthwise of the cylinder. This pleated half-round cylinder element is then moved in the direction in which its pleats extend along a trough which is arcuate in cross section, and as the pleated element travels along this trough, the front and rear ends of such element are gradually moved towards each other to impart a cylindrical shape to the element. While this is being done, a center tube is introduced into the central portion of the pleated element, and the front and rear ends of such element are secured together with a liquid-tight joint. Next, this cylindrical pleated element with the center tube there-in is forced by the machine inside of a protecting outer shell. This assembly of center tube, pleated filter element and shell is then discharged from the machine.

The machine of the present invention is designed to operate at high speed and it is capable of turning out forty or more of the assembled units just described per minute. The working parts of the machine are therefore provided, for the most part, with rollers or other anti-friction bearings, and the whole machine is sturdily constructed so that it can be operated at high speed without vibrating appreciably.

One important feature of the present invention resides in the method of, and apparatus for, advancing a pleated filter element along a support or runway which terminates in a semi-circular arc, to thereby impart to such pleated element the shape of one-half of a cylinder, and then move this element in the direction in which the pleats extend and gradually impart to such element the shape of a complete cylinder.

Another important feature of the present invention resides in the method of, and means for, bringing the leading and trailing ends of a pleated filter element, supplied by the runway, together and for tucking one of said ends into a glue-containing fold at the other end, to thereby form a liquid-tight seal between such end plates.

A further feature of the present invention resides in a number of work detecting feelers which feel for the presence of the work at successive points along the path the filter element is advanced, and if the work is not present, or properly positioned at these various detecting points, the machine will be stopped automatically.

Another feature of the present invention resides in trimming mechanism that operates to trim a leading end and trailing end of the pleated element, so that one will lie properly in the fold of the other to facilitate the formation of a liquid-tight joint between these ends.

Still another feature of the present invention resides in gripping means for engaging the outer shells, one at a time, as they are supplied to the machine by a hopper, and operable to place each shell in accurate alignment with the cylindrical pleated paper element, so that the latter can be pushed into the shell to fit tightly herein.

The above and other features of the present invention, and method for carrying out the invention, will be further understood from the following description when read in connection with the accompanying drawings; wherein Fig. 1 is a front elevation of the filter assembling machine contemplated by the present invention.

Fig. 4 is a top plan view of that portion of the assembly machine which has a runway along which the pleated elements are advanced.

Fig. 5 is an end view with parts broken away of the mechanism shown in Fig. 4.

Fig. 6, on a larger scale is a sectional view taken on the line 6—6 of Fig. 4.

Fig. 7 is a vertical sectional view showing the pleat holding means partially shown in Figs. 4 and 5.

Fig. 8 is a view similar to Fig. 4, but shows on a larger scale the mechanism for guiding the pleats into the arcuate portion of the runway.

Fig. 9 is a front elevation of hopper mechanism for delivering the center tubes, one at a time, into position in a tubular guide of the machine.

Fig. 10 is an end view with parts in section of the mechanism shown in Fig. 9.

Fig. 11 is a vertical sectional view of parts shown in Fig. 10 but shows the tube escapement element in one operating position, whereas Fig. 10 shows this escapement in another operating position.

Fig. 12 is a face view taken from the front of the machine and shows a vertical rocking arm that is employed to advance the semi-circular filter elements, step by step, along a trough towards the delivery end of the machine.

Fig. 13 is a vertical sectional view through the apparatus shown in Fig. 12.

Fig. 13ᵃ is a detailed view showing a cam mounted on the main power shaft and an electrical switch adapted to be controlled by such cam.

Fig. 14, on a relatively larger scale, is an elevational view of the suction means employed to lift an end pleat above a metal guide plate.

Fig. 15 is a transverse view through the above mentioned arcuate trough along which the semi-circular cylindrical pleated elements are advanced, step by step.

Fig. 16 is a view similar to Fig. 15, but shows a pleated element as advanced further along the transversely curved trough.

Fig. 17 is a top view looking down upon a portion of the machine provided with the guiding trough and shows the various guides for bringing the leading and trailing ends of the pleated element together.

Fig. 18 is a side view of the mechanism shown in Fig. 17.

Fig. 19 is a top plan view, with parts in section, of an internally tapered sleeve and associated parts employed to compress a cylindrical filtered element so that it may be forced into the outer protecting shell.

Fig. 20 on a smaller scale is a top plan view of the machine and shows the path of travel of the pleated elements through such machine.

Fig. 21 is an end view of a portion of the machine looking towards the discharge end of the same.

Fig. 22 is a perspective view with parts broken away of an assembled oil filter cartridge produced by the present machine.

Figure 27:
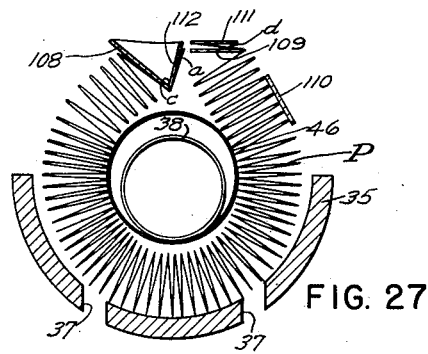
Figure 28:
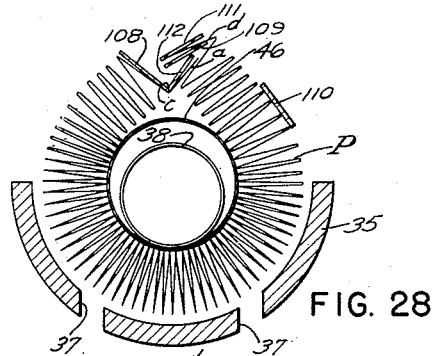
Figures 29, 31:
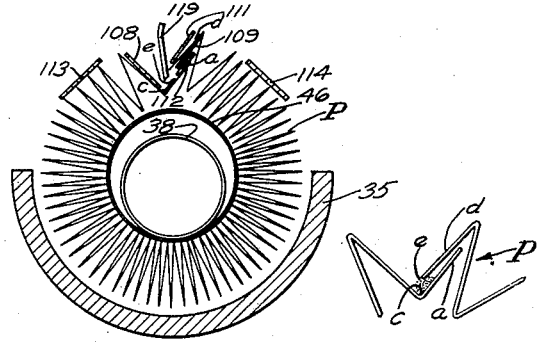

Fig. 23-30 inclusive, are vertical sectional views taken through the above mentioned arcuate trough and show the progressive steps for advancing the leading and trailing ends of the pleated element towards each other and for securing one end to the other to form a liquid-tight joint; and Fig. 31 is a relatively large end view showing how one end of the pleated element is placed in a fold at the other end of such element and is adhesively secured therein.

The embodiment of the assembling machine contemplated by the present invention, as illustrated in the drawings, will now be described. It will first be pointed out how each of the successive pleated elements, as it is advanced along a runway, is caused to assume the shape of one-half of a cylinder. It will then be pointed out how this semi-round pleated element is formed into a complete cylinder by advancing it along a trough and working its opposite ends towards each other until they can be secured together. It will also be pointed out how a center tube is introduced inside the cylindrical element, and how the cylindrical element with the center tube therein is then placed within a protecting outer shell.

Referring first to Fig. 4 of the drawings, a series of pleated elements designated by "P," and each having the same number of pleats are supplied by means, not shown, to a support or guideway 10 having opposite guide walls 11. The pleated elements "P" are preferably supplied to the guideway 10 directly from a pleat counting and cutting machine, such as forms the subject matter of our application Serial No. 553,573, filed December 16, 1955, which has matured as Patent No. 2,833,351, granted May 6, 1958, and which machine operates to count at high speed the pleats of an advancing endless strip of pleated paper and to cut such strip into the desired pleat lengths.

The pleated elements are advanced along the guideway 10 by Gilmore belts 12 and 13 which are spaced in parallel relation to each other and arranged so that the inner runs of these two belts will contact the opposite zigzag ends of the pleated elements "P" to slide these elements along the runway 10. A longitudinal bar above the pleats keeps them down on the runway 10. The present machine is designed to handle pleated elements having pleats of various lengths. The Gilmore belt 13 is therefore shown as mounted so that it can be moved towards and from the belt 12 to accommodate pleats that may vary anywhere from, say 2 inches in length, to pleats of much greater lengths. The supporting element 14 shown in Fig. 4 as extending transversely of the runway 10, serves to support a chain drive 15 for the pulley 16 that drives the Gilmore belt 13, the arrangement being such that the chain 15 will drive such belt whether it is disposed close to, or a substantial distance from the other Gilmore belt 12. It is important that these Gilmore belts press upon the opposite ends of the pleats "P" with a slight, but uniform pressure and the desired amount of pressure of the belt against the ends of the pleats is obtained by providing a bellows in the form of the relatively flat tube 17, best shown in Fig. 6 and which is supplied with air under slight pressure through the air pipe 18. This provides a very satisfactory means for maintaining the desired pressure upon the opposite ends of the pleats "P."

The pleated paper elements "P" advance in a right hand direction in Fig. 4 along the horizontal extending guideway 10 and the right hand end of this guideway terminates in a semicircular armuate portion which is well shown in Fig. 5. Now, referring more particularly to Fig. 5, it will be noted that there is disposed near the discharge end of the runway 10, a metal casting 19 which extends downwardly at right angles to the guideway 10 and this casting 19 is slotted to provide the downwardly extending guide fingers 20 which are best shown in Fig. 8. Spaced from these downwardly extending fingers 20 is another set of guides 21. The arrangement is such that the advancing pleats "P" are directed downwardly beteen the guiding fingers 20 and 21 as will be apparent from Fig. 5. After these pleats have moved downwardly a short distance, they engage a number of arcuate fingers 22 which direct the advancing pleats along a curved path, so that the leading end of the pleating element "P" shown in Fig. 5 will move upwardly until it contacts the stop 23. In order to facilitate the travel of the pleats in the arcuate path just mentioned, a series of rollers 24 are provided which freely rotate on the support shaft 25.

The Gilmore belts 12 and 13 above described, each engage the opposite zigzag ends of the pleats "P" and serve to advance the pleated elements partway along the guideway 10. As these pleats approach the downwardly extending guiding fingers 20 just mentioned, they are forced along their path of travel by additional Gilmore belts comprising the upper set of Gilmore belts 26 and the lower set of Gilmore belts 27. These belts are disposed to engage the upper and lower folded edges of the advancing pleats "P" and to feed such pleats forward with sufficient force to cause each pleated element provided with the desired number of pleats, to assume the shape of one-half of a cylinder with the pleats extending parallel to each other. The Gilmore belts 12, 13, 26 and 27 are driven by an electric motor 28 and belt 29 (see Fig. 5) which drives a pulley 30 and this pulley drives the belt 31, which in turn drives the pulley 32 for the upper Gilmore belt 26 and pulley 33 for the lower Gilmore belt 27. It is desired to point out that the primary purpose of the bellows 17 above mentioned is to control the pressure upon the ends of the advancing pleats "P" so that some slippage can occur between belts 12 and 13 and the pleats "P" to thereby make sure that the pleats are advanced towards the arcuate portion of the runway under accurately controlled feeding pressure.

Figure 1:
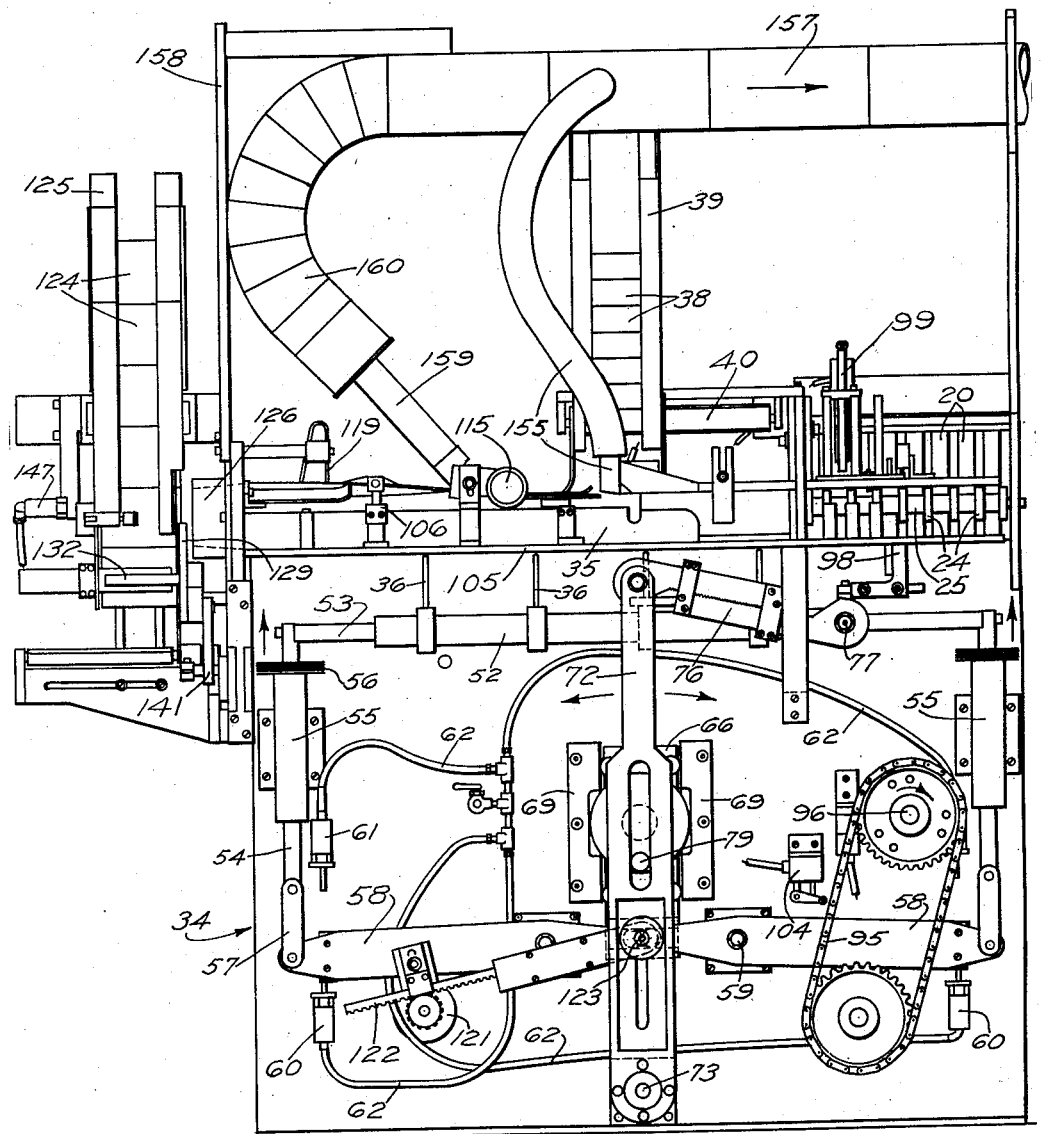

The runway 10 and other mechanisms so far described, as are all mechanisms shown in the drawings, are supported by the machine casing indicated by 34 and which is well shown in Fig. 1 of the drawing. This casing preferably has the general shape of a cabinet and serves to house most of the operating mechanism shown in Fig. 4 of the drawing. This casing is preferably provided with doors, not shown, disposed at the front of the casing and which may be opened to permit access to the main power shaft and other driving mechanism shown in Fig. 1. These doors are normally kept closed.

After a pleated element "P" has been moved into the arcuated portion of the delivery end of the runway 10 to form one-half of a cylinder as shown in Fig. 5, it is then moved in a horizontal direction at right angles to the runway 10 along a trough 35 which is arcuate in cross section as shown, for example, in Figs. 15 and 16 of the drawings. The pleated element "P" is pushed along this arcuate trough in successive steps, and as it is moved along this trough, the leading and trailing ends of such pleated element, that is, the leading and trailing end, as the pleats advance along the runway 10, are gradually worked towards each other as will be apparent by observing the successive position of such ends in Figs. 23 to 30 inclusive.

The pleated elements "P" are forced into the downwardly curved portion of the runway 10 by the Gilmore belts above described. After a leading pleated element has filled this arcuate portion of the runway, as shown in Fig. 5, it is, as above stated, moved in the direction in which its pleats extend along the trough 35 towards the discharge end of the machine. The mechanism for moving the arcuate pleated element "P" in successive steps along this trough comprises pairs of upwardly extending pins 36 which are well illustrated in Figs. 15 and 16. These pins normally occupy the lower position in which they are shown in full lines in Figs. 15 and 16, but are periodically raised to the upper position in which they are shown in dotted lines in Fig. 15. The arrangement is such that these pins are raised and lowered by mechanism to be described, to contact the end of the pleats "P" and push them a predetermined distance along the trough 35. It should be noted from Figs. 15 and 16 that the trough is provided with long slots 37 cut in the bottom thereof to receive the pins 36. As will be seen from Fig. 1, four sets of these pusher pins 36 are provided. Each set serves to push a pleated element "P" a predetermined distance along the trough, so that the pleated element will then be advanced by another set of pins 36.

Referring again to Figs. 23–30 inclusive, it will be seen that the half-round pleated element "P" is gradually given the shape of a complete cylinder. A perforated center tube 38 needs to be introduced within the pleated element "P" before it is formed into the complete cylinder shown in Fig. 30. This center tube is therefore introduced within the arcuate pleated member "P" while it is being advanced along the trough 35.

The center tubes 38 are supplied to the present assembling machine from a hopper 39, shown in Fig. 1 as disposed above the machine so that these hoppers will move by gravity downwardly into a position directly above the trough 35. Near the lower end of this hopper 39 is provided an escapement device, of well-known construction, and which is best shown in Figs. 9, 10 and 11. This escapement comprises a relatively long sheet metal bar 40 having a supporting pivot 41 at each end thereof which rotates in a supporting bracket 42. The escapement 40 has a laterally extending upper lip 43 and laterally extending lower lip 44, as will be apparent from Figs. 10 and 11. This escapement is normally held by the tension of a coiled spring 45 in the tilted position in which it is shown in Fig. 10 to support the stack of center tubes 38. When a center tube is to be released, the escapement is momentarily rocked from the position in which it is shown in Fig. 10 to that in which it is shown in Fig. 11, to thereby release and drop the lowermost center tube into a long guiding pipe or tube 46. The escapement 40 is momentarily rocked to the position in which it is shown in Fig. 11 by a solenoid 47 having a projecting pin 48 which forces the escapement to the position in which it is shown in Fig. 11 against the tension of the spring 45.

A center tube 38, upon being released by the escapement 40, drops into the guiding pipe or tube 46, which tube is rigidly supported from one end thereof by the supporting frame 49, (see Fig. 8.) The upper portion of the tube 46 is cut away as shown in Figs. 8, 9 and 10, so that the center tube may drop therein, and a long slot 50 is formed in the lower portion of this tube as shown in Figs. 8, 10, 15 and 16. This slot is provided to receive a pusher pin 51, which is shown in full lines in its lower position in Fig. 15 and in dotted lines in its raised position. This pin can be moved upwardly through the slot 50 to engage a center tube 38 and slide it along the supporting pipe 46 towards the delivery end of the machine. Only one of these pusher pins 51 is needed, since the center tubes, when formed of sheet metal, are relatively stiff, and if one abuts against another, a push upon one will advance a series of center tubes along the pipe 46 to a position to be introduced within the cylindrically pleated element "P."

Power operating mechanism

Having described the pusher pins 36 and 51, and the function which they perform, the mechanism for operating these pins will now be described. This mechanism is well shown in Fig. 1, and comprises a long sliding sleeve or tube 52 which is slidably mounted on a horizontally extending bar 53. This bar is normally supported in the lower position in which it is shown in Fig. 1 but is adapted to be raised to elevate the pins 35 into position to engage the pleated elements "P," and the pin 51 to engage a center tube 38. The bar 53 has its opposite ends secured to the vertically extending reciprocating posts 54, which are slidably mounted in bearing brackets 55, and a protecting bellows-like element 56 is preferably provided at the upper end of each bracket to exclude dirt from the sliding posts 54. Each post 54 has its lower end connected by a link 57 to the outer end of a rocking lever 58. Each of these levers is pivotally mounted at 59 on a pivot pin that is rigidly secured to the machine frame. Positive rocking movement is imparted to the inner end of each lever 58 by mechanism to be described, to thereby raise and lower the horizontally extending shaft 53 in timed relation with the operation of other portions of the machine. The machine of the present invention, as above stated, is designed to operate at high speed. Therefore, a shock absorbing device 60 is provided to arrest the downward rocking movement of each lever 58 and a similar shock absorbing device 61 is provided to arrest the upward rocking movement of such lever. These shock absorbers comprise air cylinders having the piston pin shown extending therefrom. Air at the desired pressure, such as 50 pounds or more per square inch is supplied to each cylinder by the air pipes 62, which lead from a compressed air chamber 63, best shown in Figs. 2 and 3. The pressure of the air in such chamber is maintained at the desired pressure above atmosphere by adjusting the valve 64 (see Fig. 2). The pressure within the tank is indicated by the pressure gauge 65.

The desired reciprocating movement is imparted to the rocking levers 58 by a vertically sliding block 66 which is best shown in Figs. 12 and 13. This block which is provided with the anti-friction rollers 67 and 68 is mounted to move up and down along the fixed guideways 69. The lower portion of this sliding block 66 is provided with the transversely extending slotted portion 70 adapted to receive the antifriction rollers 71 pivotally secured to the inner ends of the rocking levers 58. The arrangement is such that as the sliding block is moved up and down by cam means to be described, the levers 58 will be rocked to raise and lower the horizontally extending bar 53.

As above stated, the long sleeve 52 which has the upwardly extending fingers 36 and 51 rigidly secured thereto, is mounted for sliding movement upon the supporting shaft 53. This long sleeve is moved back and forth along the shaft 53 by operating mechanism which is best shown in Figs. 1, 12 and 13. This operating means comprises a relatively long upwardly extending arm 72, the lower end of which is pivotally secured at 73 to the vertical wall 74 of the machine frame. To the upper end of the lever 72 is pivotally secured at 75, a connecting link 76 and the other end of this link is secured by a pivot pin 77 to the sliding sleeve 52. This link is formed in two parts as will be apparent from Fig. 1 and may be adjusted to vary the length of the link, and thereby vary the travel imparted to the sleeve 52 when this is necessary to accommodate pleated elements of different lengths. The upright lever 72 has its central portion thereof slotted as shown at 78 to receive the projecting pin 79 that is supported by a crank head 80 rigidly secured to one end of the main power shaft 81. This pin 79 is adjustably secured to the head 80 so that it may be moved towards and from the power shaft 81 to vary the length of the stroke through which the lever 72 will be moved.

The main power shaft 81 just mentioned is driven by a sprocket chain 82 and sprocket wheel 83 rigidly secured to one end of this shaft. Near the other end of this shaft is rigidly secured a cam 84 which serves to operate the sliding head 66 (see Figs. 12 and 13). This head has rotatably secured thereto a lower roller 85 and upper roller 86, which continuously engage the operating cam 84 and impart a vertical sliding movement to the head 66. Referring to Fig. 1 of the drawing, it will be noted that the outer ends of the rocking levers 58 support the weight of the bar 53, sliding sleeve 52 and uprights 54, with the result that this weight exerts a constant upward thrust upon the sliding head 66. In order to offset this upward thrust and balance the operation of the sliding head, a pneumatic cylinder 87 is provided having a downwardly extending plunger 88. This cylinder is secured to a supporting bracket 89 and is supplied with compressed air by a pipe 90 which leads from a storage air pressure tank 91, see Fig. 2. This constant downward pressure by the air cylinder 87 will balance the weight of the lever parts.

Figure 2:
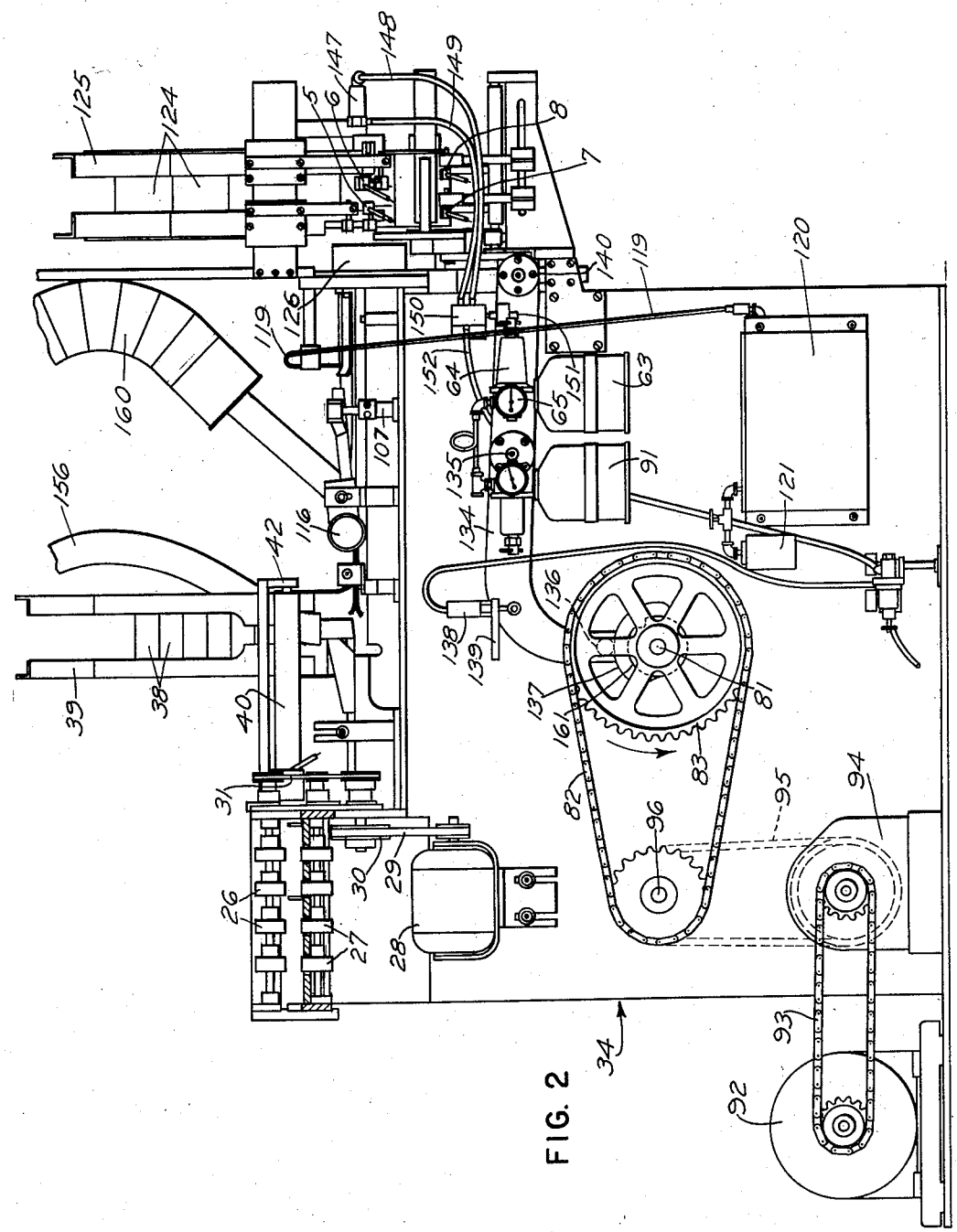
Fig. 2 is a similar view looking at the rear of such machine.

Having mentioned the main power shaft 81, the driving mechanism for the same will now be described. Such driving mechanism is best shown in Fig. 2 and comprises an electric motor 92 which drives a chain 93 and this chain drives a shaft extending into the variable speed drive box 94. A chain 95 extending upwardly from this drive box imparts power to a horizontally extending shaft 96, which shaft is best shown in Fig. 5. This shaft 96 is provided with a combined electric clutch and brake 97 of well-known construction and which is controlled by an electrical switch, to be described. The arrangement is such that the operating part of the machine of the present invention may be automatically stopped quickly without stopping the main driving motor 92. The automatic clutch and brake mechanism shown in Fig. 5 drives the chain 82 above mentioned, and this chain rotates sprocket 83 which drives the main power shaft 81.

When the power shaft 81 is rotated, the cam 84 upon this shaft will periodically raise and lower the sliding block 66 to thereby raise and lower the long sleeve 52 so as to elevate the pins 36 and 51 to engage, respectively, the pleated paper elements "P" and center tube 38. While these pins are raised, it is necessary to move the sleeve 52 in a left hand direction, viewing Fig. 1, so as to advance the pleated elements and center tubes towards the discharge end of the machine. The vertical rocking lever 72 is actuated by the crank head 80 to rock this lever back and forth as indicated by the arrows shown in Fig. 1. The arrangement is such that the rocking lever 72 will advance the tube 52 in a right hand direction, view Fig. 1, to the end of its stroke in this direction. Then the sliding head 66 will elevate this sleeve 52 and the pins which it carries. Then this sliding tube 52 will be moved by its lever 72 a full stroke in the left hand direction, and then lowered to the position in which it is shown in Fig. 1. The levers 58 raise and lower the sleeve 52 at the proper time, and this sleeve is provided at its right hand end with a curved finger 98, which is best shown in Fig. 5. The purpose of this finger is to engage the end of the pleated element "P" lying in the arcuate portion of the runway and impart the initial movement to this pleated element along the arcuate trough 35.

It is important that only one pleated element "P" at a time lie in the arcuate portion disposed at the delivery end of the runway 10. The Gilmore belts above mentioned serve to engage the paper pleats only lightly to feed the paper towards the arcuate runway. In order that only one pleated element at a time will occupy this curved portion of the runway, a rocking lever 99 is provided which is pivoted at 100 (see Fig. 7). The lower end 101 of this lever is positioned to be moved into and out of engagement with the pleated element which is about to pass downwardly into this arcuate portion of the runway. The rocking lever 99 is continuously urged towards its inactive position by the pull of a spring 102. This lever is forced to the pleat hold position in which it is shown in Fig. 7 by exciting a solenoid 103. The solenoid 103 and a solenoid 47, which is provided to actuate the escapement that controls the downward feeding of the center tube 38, are both controlled by a switch 104 that is actuated by the rising movement of a rocking lever 58, see Fig. 1. The arrangement is such that as the levers 58 move upwardly, one of them will actuate the switch 104, and this will serve to release a center tube 38, and also move the rocking lever 99 to the pleat holding position in which it is shown in Fig. 7. This will prevent the pleated element it engages from moving downwardly into the arcuate portion of the runway at the time the element "P" in this portion of the runway is being moved toward the arcuate trough 35.

*Mechanism for uniting ends of pleated elements*

In manufacturing oil filter cartridges, such as herein contemplated, it is important that the leading end and trailing end of the pleated element "P" be secured together with a liquid-tight seam which will not leak during the life of the pleated cartridge. Such seam is formed by the present machine by inserting a flap at one end of the pleated element within a fold at the other end of such element, and by introducing cement into such fold to bond the flap in place. This seam is produced as a pleated element "P" is moved, step by step, along the arcuate guide trough 35.

Figure 25:
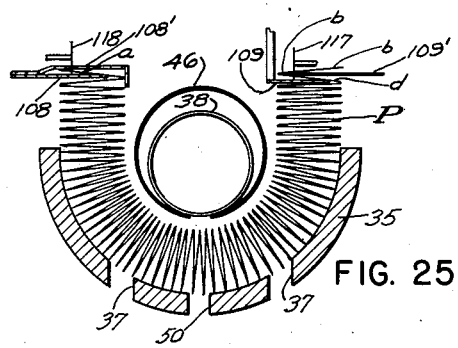
Figure 26:
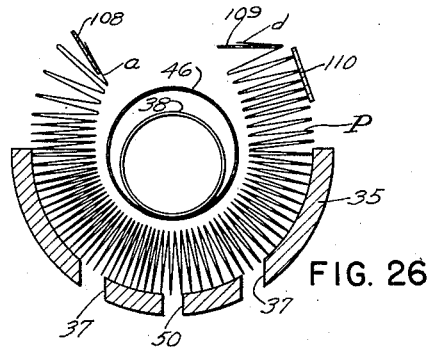

The apparatus for forming this seam will now be described. It consists largely of a number of long flat metal bars that are gradually curved throughout their length. These bars serve to work the half-round pleated element shown in Fig. 23 to the cylindrical shape in Fig. 30. These guide bars are mounted upon the table top 105 and each is supported at the desired distance above this table top by adjustable brackets such as indicated by 106 and 107. In all, there are seven of these longitudinally extending flat metal guide bars indicated by 108–114 inclusive. The guide bar 108 is disposed along the front of the machine, while the guide bar 109 is located at the rear of the machine. As the pleated element "P" is moved along the trough shaped guideway 35, step by step, it is important to raise the uppermost flap at the leading end of the pleated element so as to cause this flap "a" to overlie the guide bar 108. It should be noted that the bar 108 has secured thereto a second bar 108' positioned so that the uppermost flap "a" will lie between the bars 108 and 108', as best shown in Fig. 25. It should also be noted that the fold "b" resting upon the guide bar 109 is forced inwardly by the guide bar 109' disposed within the fold "b" as shown in Fig. 25.

As above pointed out, it is assumed that the pleated elements "P," being supplied to this machine, were cut from a continuous length of pleated paper by a cutter as disclosed in our above cited previously filed application. If so cut, the cut will be formed at the bottom knuckle of the pleated paper. In order to form the liquid-tight joint herein contemplated, it is found desirable to trim the flap "a" and fold "b" above mentioned. This trimming operation is effected by providing on the machine frame a pair of small electrical motors 115 and 116, which are best shown in Figs. 17, 18 and 19. The motor 115 is provided with a rotary cutter 117 and the motor 116 is provided with a rotary cutter 118. The arrangement is such that as the pleated paper element "P" is pushed along its path of travel, the paper flap "a" and the fold "b" are moved under these rotating cutters while the paper is supported by the guide bars 108 and 109. The pleated elements are successively moved along the arcuate trough 35 by the various sets of pushing pins 36, shown in Fig. 1. The flap "a" is severed near its outer edge but the fold "b" is severed near its inner knuckle as shown. The leading and trailing ends of such pleats will be gradually worked towards each other by the guide bars 108—114 above mentioned. This will be apparent by observing Figs. 23-29 inclusive.

As the flap "a" and fold "b" are moved towards each other, it is important to so manipulate the flap "a" that it will form a glue receiving fold "c," and to raise the remaining portion of the fold "b" to form the projecting flap "d." The manner in which this is accomplished will be understood by examining Figs. 27, 28 and 29, wherein it will be seen that the remaining portion of the fold "b" is elevated by guide bars so that the flap "d" can enter the fold "c" as shown in Fig. 28, at which time glue "e" or other bonding agent is delivered into the fold "c" by the glue pipe 119. Glue is supplied to this pipe from the glue tank 120 shown in Fig. 2. Mounted adjacent this tank is a gear-type glue pump 121, see Fig. 1, which is operated periodically by a rack 122 that engages a driving gear of this pump. This rack 122 is pivotally secured to the rocking lever 72 at 123, and it can be raised and lowered along the slot shown to vary its stroke. The arrangement is such that the glue pump will be actuated by the vertical lever 72 periodically, so as to deliver glue "e" to the fold "c" of the advancing filter element "P," just before the flap "a" is forced into such fold.

Figure 23:
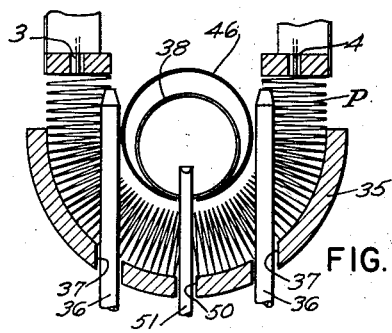
Figure 24:
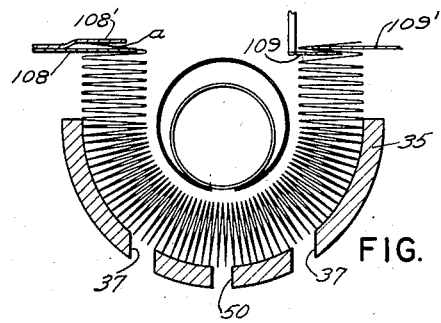

During the time that the pleated element "P" is being changed from the half-round configuration shown in Fig. 23 to the cylindrical shape shown in Fig. 29, center tubes 38 are moved along the guide pipe 46 by the pusher pin 51, and since these center tubes are relatively stiff, one tube may be relied upon to push another along this tube and out of its discharge end. The operation is such that a center tube and surrounding cylindrical pleated element "P" will arrive at the delivery end of the machine at the same time. As above pointed out, the filter element herein contemplated comprises a center tube, a surrounding cylindrical element formed of pleated paper, and a protecting outer shell. It will be clear from the foregoing how the center tube is placed within the cylindrical pleated element, and how the ends of such pleated element are secured together. It will now be pointed out how such pleated element is placed by the present machine in a protecting outer shell 124.

*Mechanism for inserting pleated paper in shell*

Figure 3:
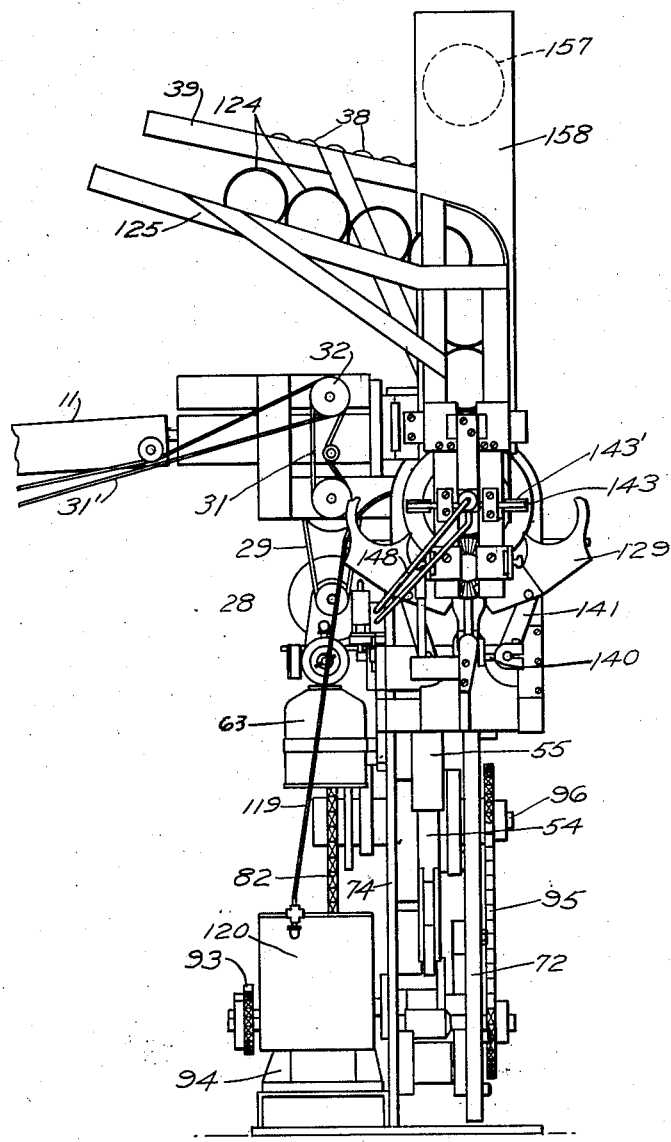
Fig. 3 is an end view of such machine looking at the delivery end thereof.

The shells 124 are supplied by a hopper 125, shown in Figs. 1, 2 and 3, to the delivery end of the machine as the cylindrical pleated element "P" approached such delivery end of the machine. The cylindrical pleated element is forced into a sleeve 126 secured to a portion of the end frame 127 of the machine. This sleeve has an internal taper as best seen in Fig. 19. The arrangement is such that as a pleated element "P" is forced through this tapered sleeve 126, it will be compressed into close engagement with the center tube 38. In accordance with the present invention, a shell 124 is held in accurately aligned relation with the delivery end of the tapered sleeve 126 and against such sleeve, so that the pleated element P with a center tube therein may be forced into this shell to fit snugly therein. As shown, the shell 124 has an inwardly extending annular bead 128 near each end thereof and it is this annular bead that snugly embraces the pleated element P, as will be apparent from Fig. 19.

The means provided for holding a shell 124 in position to receive a pleated element P are best shown in Fig. 21. This means comprises two similar rocking levers 129, each of which is pivotally mounted upon a fixed support by a pivot pin 130. Each of these levers is provided with an upwardly extending arcuate finger 131 as best shown in Fig. 21. These fingers 131 are shown in full lines in the shell gripping position, and in dotted lines in the shell releasing position. Each rocking lever 129 has extending laterally therefrom a bar or pipe 132, upon which the shell 124 may rest. These bars help to hold the shell in a horizontal position while it is being moved to its loading position. It should be pointed out that each curved finger 131 has rigidly secured thereto an arcuate block 133 that snugly embraces the outer face of the tapered sleeve 126. This serves to center the fingers 131 with respect to the bore of the sleeve 126, so that the pleated element P may be pushed into a shell 124 when an end of such shell is held in abutting engagement with the outer end of the tapered sleeve 126. The levers 129 are periodically actuated to move the finger 131 into and out of the shell engaging position. The actuating means comprises a lever 134, which is pivotally secured to the main frame at 135, see Fig. 2. This lever has a curved downwardly extending end provided with a roller 136 that engages and is actuated by a cam 137 rigidly secured to the power shaft 81. This roller 136 is held at all times in engagement with the actuating cam 137 by a compressed air cylinder 138 supported by a fixed bracket 139. This cylinder has a downwardly extending plunger that exerts a continuous downward pressure upon the curved end of the lever 134.

Figure 30:
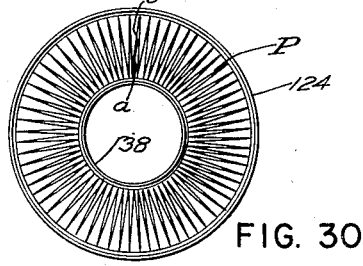

The opposite end of this lever 134 has a sliding cross head 140 to which is pivotally secured a pair of upwardly extending links 141, see Fig. 21. The upper ends of these links 141 are pivotally secured at 142 to the swinging levers 129. The arrangement is such that as the power shaft 81 rotates, its cam 137 will periodically rock the shell-engaging levers 129 to and from the full line position in which they are shown in Fig. 21. After a shell 124 has been engaged by the fingers 131, it is necessary to move the shell axially a short distance, so that its end will about against the face of the sleeve 126 as shown in Fig. 19. This movement of the shell is effected by a horizontally extending slide 143 having a head 143' at each end thereof, and in each head is pivotally mounted a finger 144. To the outer end of each finger 144 is secured an enlargement 145 provided with a rubber member 146 adapted to frictionally engage a shell. These rubber members serve to center a shell and move it to and from abutting engagement with the sleeve 126. The sliding head 143 is moved back and forth by an air cylinder 147 which is supplied with compressed air at first one end of the cylinder and then the other by the air pipes 148 and 149. The supply of air in these pipes is controlled by valve means 150 and the valve therein is actuated by a projection 151 at the outer end of the rocking lever 134, see Fig. 2. Compressed air is supplied to this valve means by a pipe 152 which leads from one of the pressure chambers 63 or 91. As the slide 143 is moved in a left hand direction in Fig. 19, the heads 145 will engage the cams 145' and be forced by these cams out of contact with the shell 124. The arrangement is such that the slide 143 abuts against the outer end of the shell 124 and holds the shell firmly against the tapered sleeve 126 at the time a pleated element P and center tube 38 are being forced into the shell. As soon as the operation of inserting a center tube and pleated element into a shell 124 is completed, the levers 129 are rocked to the dotted position in which they are shown in Fig. 21. This permits the filter element to drop by gravity to the position in which it is shown in dotted lines, see Fig. 21, and it may then fall into a hopper 152, see Fig. 20. At this time, an upwardly extending finger 153, shown in an inclined position in Fig. 21, and pivotally supported by a bracket 154, is moved by the element 140 to a vertical position so that it will arrest the downward movement of a loading shell. This will support an empty shell in position to be engaged by the fingers 129 as shown in Fig. 21. As the pleated element P is forced through the tapered sleeve 126, its outside diameter will be reduced, as shown in Fig. 30. This among other things serves to force the paper flap $d$ into close contact with the adhesive $e$ as will be apparent from Figs. 30 and 31.

As above mentioned, it is important that a leading flap $a$ of the pleated element P be raised to rest upon the guide bar 108 and that the fold $b$ be raised to rest upon the guide bar 109. The lifting of such flap is effected by a suction tube 155, and the lifting of such fold is effected by the suction tube 156. The suction tubes extend downwardly from a larger suction pipe 157 supported above the machine by brackets 158. The narrow strips of paper cut from the pleats by the rotating knives 116 and 117 are removed from the machine by suction tubes 159 that are connected to the curved portion 160 of the suction pipe 157.

The present machine is designed, as above stated, to operate at high speed, and means are provided in the form of the combined electric clutch and brake 97 for stopping the machine quickly when something goes wrong. It is important that the machine be quickly stopped if work is missing from any one of a number of points along the path the work travels in the machine, or if the work is not properly positioned at these points of travel as indicated in Figs. 4, 5, 8, 20 and 23. In Fig. 4 a feeler finger 1 is provided to make sure that a supply of pleated paper "P" is being moved along the runway 10. A feeler finger 2 is provided, as shown in Figs. 4 and 5 and is operated by the upward pressure of the pleated paper element "P" in the arcuated portion at the end of the runway 10. A feeler finger 3 is provided to feel for the flap "$a$" and a feeler finger 4 is provided to feel for the fold "$b$" as shown in Fig. 23. Laterally spaced feeler fingers 5 and 6 are provided to feel for a shell 124 in the loading position, and two more fingers 7 and 8 are provided to feel for the loaded cartridges when it drops down from the loading position. The fingers 5, 6, 7 and 8 are shown in Fig. 2. The feeler fingers 1 to 8 inclusive are connected in series in an electric circuit that controls the clutch and brake 97, and if any one of these fingers is not actuated, the machine will stop. A cam wheel 161 on the main shaft 81 and switch 162, as shown in Fig. 13ª, makes sure that the shaft 81 will always come to rest in the same position with the finger carrying sleeve 52 in the down position of Fig. 1.

The assembled oil filter cartridge, when discharged from the machine of the present invention, comprises the center tube 38, pleated element "P," and shell 124, as shown in Fig. 22. It will be understood from the foregoing that the present machinery produces this assembly by advancing a series of pleated elements "P" along the runway 10 so that each pleated element moves into the arcuate portion disposed at the end of this runway. Then these elements in their half-round condition are moved along the transversely curved trough 35, at which time they are caused to assume the shape of a complete cylinder, and the forward and rear end pleats are secured together. While this is being done, a center tube 38 is moved into place within the pleated element. Next, the cylindrical pleated element and center tubes are forced into a shell 124 to fit tightly therein. This completes the assembly operation performed by the present invention.

Having thus described our invention, what we claim and desire to protect by Letters Patent is:

1. The method of forming lengths of pleated filter paper having the pleats extending transversely thereof into annular elements which comprises advancing such lengths, one after the other, at right angles to the pleats along a runway that terminates in a semi-circular arc, moving the pleated element lying in such arc in the direction of the pleats along a guiding trough so as to work the end flaps of such pleated element towards each other, trimming an end flap as the element moves along said trough, and inserting an end flap at one end of such element into a fold at the other end of such element to form an annular filter element.

2. The method of forming lengths of pleated filter paper having the pleats extending transversely thereof into annular elements which comprises advancing such lengths, one after the other, at right angles to the pleats along a runway that terminates in a semi-circular arc, moving the pleated element lying in such arc in the direction of the pleats along a guiding trough so as to work the end flaps of such pleated element towards each other, trimming an end flap as the element moves along said trough, introducing cement in an end pleat fold as the element moves along said trough, and inserting an end flap into said fold to engage the cement and thereby form an annular filter element.

3. In a machine of the type described, means for advancing lengths of pleated filter paper having the pleats extending transversely of the paper along a runway that terminates in a semi-circular arc to cause the pleated element to take an arc shape, means for moving the arcuate pleated element axially of the semi-circular arc portion of the runway in the direction of its pleats along a guiding trough to keep the element in its curved shape, means for guiding the end flaps of the transversely curved element towards each other as the element travels along said trough, and means for uniting these end flaps to form an annular filter element.

4. In a machine of the type described, means for advancing lengths of pleated filter paper having the pleats extending transversely of the paper along a runway that terminates in a semi-circular arc to cause the pleated element to take an arc shape, means for moving the arcuate pleated element in the direction of its pleats along a guiding trough, curved guide bars adjacent said trough for guiding the end flaps of the pleated element towards each other, vacuum means for lifting an end flap over a guide bar to rest thereon, and means for uniting the end flaps to form an annular filter element.

5. In a machine of the type described, means for advancing lengths of pleated filter paper having the pleats extending transversely of the paper along a runway that terminates in a semi-circular arc to cause the pleated element to take an arc shape, means for moving the arcuate pleated element in the direction of its pleats along a guiding trough, curved guide bars adjacent said trough for guiding the end flaps of the pleated element towards each other, vacuum means for lifting an end flap over a guide bar to rest thereon, a cutter for cutting an end flap as it rests on said bar, and means for uniting the end flaps to form an annular filter element.

6. In a machine of the type described, means for successively forming lengths of pleated filter elements into arcuate shapes with the pleats extending parallel to the axis of the arcuate shape, means for moving each arcuate pleated element in the direction of its pleats along a guiding trough, means for guiding the end flaps of said element towards each other as such element moves along said trough, and guide means for guiding an end flap of the element into an end fold of such element to unite the ends of the element and thereby form an annular filter element.

7. In a machine of the type described, means for successively forming lengths of pleated filter elements into arcuate shapes with the pleats extending parallel to the axis of the arcuate shape, means for moving each arcuate pleated element in the direction of its pleats along a guiding trough, means for guiding the end flaps of said element towards each other as such element moves along said trough, guide means for guiding the end flaps into contact with each other, a tapered sleeve at the end of said trough, and means for pushing the element through the tapered sleeve to force the contacting flaps into close engagement with each other.

8. In a machine of the type described, means for successively forming lengths of pleated filter elements into arcuate shapes with the pleats extending parallel to the axis of the arcuate shape, means for moving each arcuate pleated element in the direction of its pleats along a guiding trough, means for guiding the end flaps of said element towards each other as such element moves along said trough, guide means for guiding the end flaps of the element toward each other, means for placing a center tube within the arcuate element as it advances along said trough, and means for uniting the end flaps of the element to form an annular filter element.

9. In a machine of the type described, means for successively forming lengths of pleated filter elements into arcuate shape with the pleats extending parallel to the axis of the arcuate shape, means for moving each arcuate pleated element in the direction of its pleats along a guiding trough, means for guiding the end flaps of said element towards each other as such element moves along said trough, a center tube guideway adjacent said trough, means for moving center tubes along this guideway to deliver a center tube within the rounded filter element, and means for uniting the end flaps of the filter element about a center tube to form an assembled filter.

10. A machine for assembling filter parts into an annular filter cartridge, comprising means for successively forming lengths of pleated filter elements into an arcuate shape with the pleats extending parallel to each other, means for moving each arcuate pleated element in the direction of its pleats along a guideway and for guiding the end flaps of such element towards each other, means for delivering a center tube within the arcuate pleated element, means for forcing the pleats of said element against the center tube and for compressing the pleated element, and means for forcing the compressed pleated element into an outer shell.

11. A machine for assembling filter parts into an annular filter cartridge, comprising means for successively forming lengths of pleated filter elements into an arcuate shape with the pleats extending parallel to each other, means for moving each arcuate pleated element in the direction of its pleats along a guideway and for guiding the end flaps of such element towards each other, means for delivering a center tube within the arcuate pleated element, a sleeve having a tapered bore, and means for forcing the pleated element with a center tube therein through this sleeve to compress the pleats against the tube and force this compressed element into an outer shell.

12. A machine for assembling filter parts into an annular filter cartridge, comprising means for successively forming lengths of pleated filter elements into an arcuate shape with the pleats extending parallel to each other, means for moving each arcuate pleated element in the direction of its pleats along a guideway and for guiding the end flaps of such element towards each other, means for delivering a center tube within the arcuate pleated element, a sleeve having a tapered bore to receive the arcuate pleated element, shell gripping fingers and operating means therefore to cause the fingers to grip a shell and align it with said sleeve, and means for pushing the rounded pleated element through the tapered sleeve to reduce its diameter and force it into said shell.

13. A machine for assembling filter parts into an annular filter cartridge, comprising means for successively forming lengths of pleated filter elements into an arcuate shape with the pleats parallel to each other, means for moving each arcuate pleated element in the direction of its pleats along a guideway and for guiding the end flaps of said element towards each other, and means for compressing the element into a cylindrical shape with the pleats close together and for forcing this element into an outer shell, comprising an internally tapered sleeve, means for pushing the pleated element through this sleeve, and shell positioning fingers adapted to engage a shell and move it into position to receive the annular pleated element as such element is forced out of said sleeve.

14. A machine for assembling filter parts, comprising means for successively forming lengths of pleated filter elements into an arcuate shape with the pleats parallel to each other, a transversely curved guide trough for the arcuate filter element, a center tube receiving pipe extending lengthwise of said trough, and power operated fingers for pushing an arcuate element along said trough and a center tube along its pipe so as to deliver a center tube within the arcuate pleated element, and guides for moving the end folds of the pleated element towards each other to form an annular pleated filter element about a center tube.

15. In a machine of the type described, a runway for successive lengths of pleated filter paper having parallel pleats, means for moving these pleated lengths along the runway under an accurately controlled advancing pressure comprising two endless belts each having a run disposed adjacent a zigzag end of the pleated element, and a pneumatic tube positioned adjacent one belt run and adapted when inflated to force such belt run against the paper with a feeding pressure controlled by the tube inflating pressure; and means for securing the opposite end flaps of the pleated element together to form a closed filter element.

16. In a machine of the type described, a runway for successive lengths of pleated filter paper and which terminates in a semi-circular arc to cause the pleated elements to take an arc shape, means for moving successive pleated lengths along said runway and into the semi-circular portion thereof, a pleat holding element operable to hold back the advancing pleated elements so that only one pleated element at a time will enter said semi-circular portion; and means for securing the opposite end flaps of the pleated element together to form a closed filter element.

17. In a machine of the type described, a runway for successive lengths of pleated filter paper and which terminates in a semi-circular arc to cause the pleated elements to take an arc shape, means for moving successive pleated lengths along said runway and into the semi-circular portion thereof, a pleat guiding trough extending at right angles to said runway, means for moving said element out of the arcuate portion of the runway along said trough and for forcing the end flaps of the element towards each other, means for securing said end flaps together, and electrical stop mechanism along said runway and trough to feel for the presence of the filter element.

18. In a machine of the type described, a runway for successive lengths of pleated filter paper and which terminates in a semi-circular arc to cause the pleated elements to take an arc shape, means for moving successive pleats along said runway and into the arcuate part thereof, a trough extending at right angles to said runway, means for moving pleated elements out of the arcuate portion along said trough, means for trimming the end flap of a pleated element as it moves along said trough and for uniting the end flaps, and vacuum means for removing the piece of paper trimmed from said flap.

References Cited in the file of this patent

UNITED STATES PATENTS 2,631,508    Muehling  --------------  Mar. 17, 1953

FOREIGN PATENTS 576,751    Germany  --------------  May 16, 1933